Figure 1:
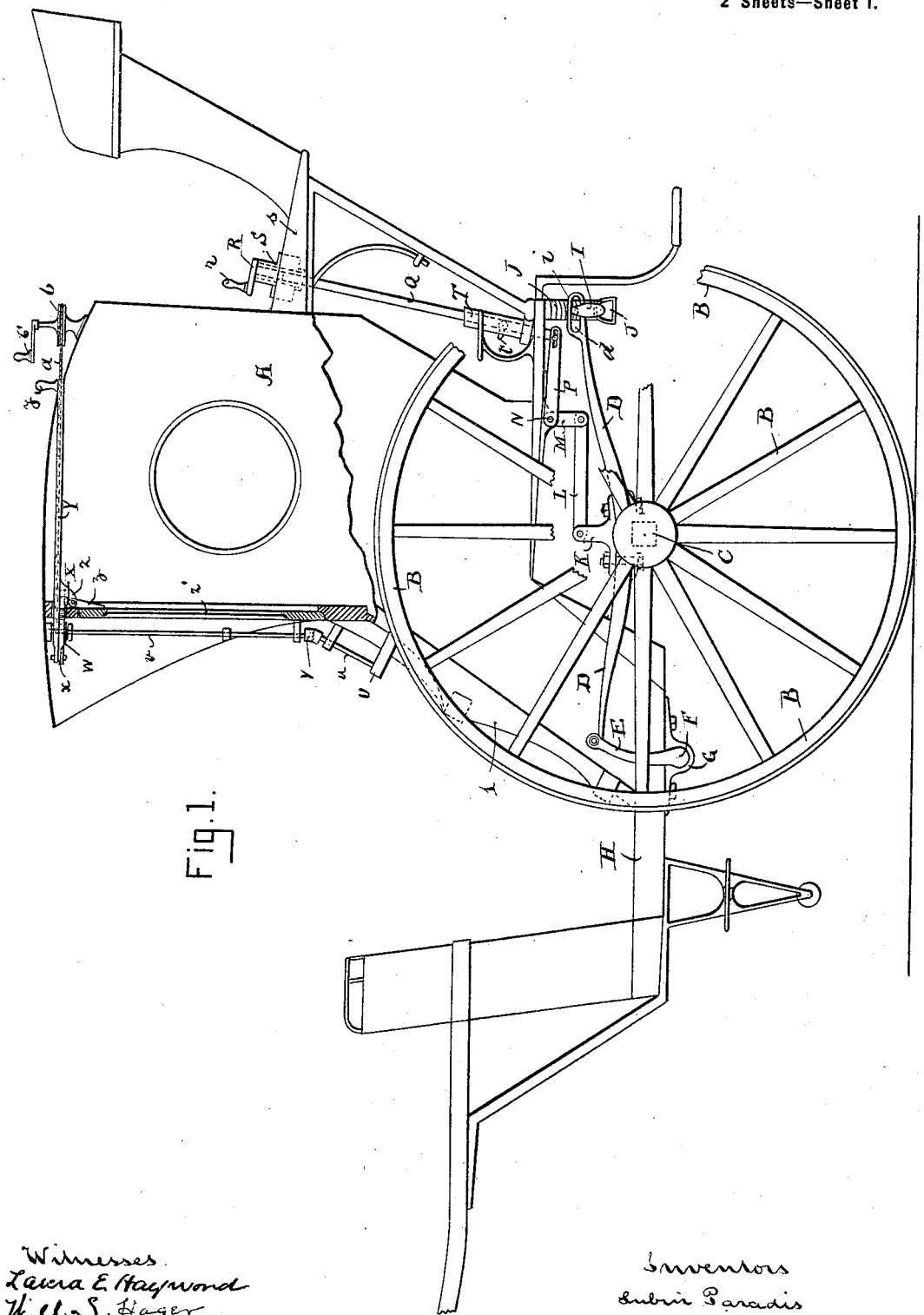

No. 615,633. Patented Dec. 6, 1898.
L. PARADIS & N. DESROSIERS.
HANSOM CAB.
(Application filed Jan. 31, 1898.)
(No Model.) 2 Sheets—Sheet 1.

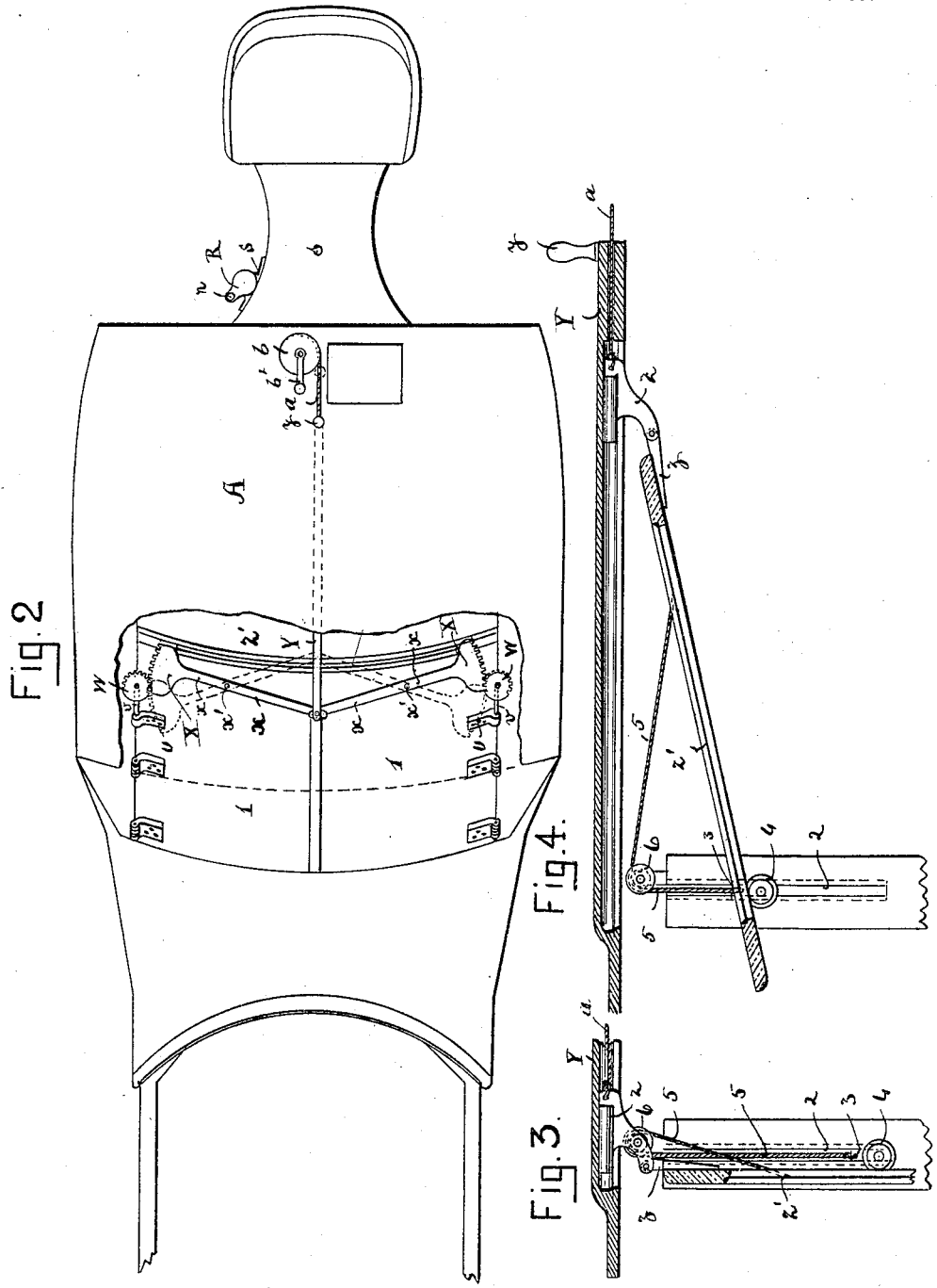

UNITED STATES PATENT OFFICE.

LUBIN PARADIS, OF CAMBRIDGE, AND NARCISSE DESROSIERS, OF BOSTON, MASSACHUSETTS.

HANSOM-CAB.

SPECIFICATION forming part of Letters Patent No. 615,633, dated December 6, 1898.

Application filed January 31, 1898. Serial No. 668,580. (No model.)

*To all whom it may concern:*

Be it known that we, LUBIN PARADIS, of Cambridge, in the county of Middlesex, and NARCISSE DESROSIERS, of Boston, in the county of Suffolk, State of Massachusetts, have invented certain new and useful Improvements in Hansom-Cabs, of which the following, taken in connection with the accompanying drawings, is a specification.

Our invention relates to that class of two-wheeled vehicles known as "hansom-cabs;" and the invention consists in the means for operating the window-sash and the folding doors from the driver's seat, as hereinafter described, and pointed out in the claims.

Referring to the accompanying drawings, Figure 1 represents a side view, partially in section, of a hansom-cab embodying our invention. Fig. 2 is a plan or top view of the same, a portion of the roof being shown broken away in order to show the door-operating device. Fig. 3 is a detail view of the window-operating device, showing the window in the closed position. Fig. 4 is a similar view showing the window raised to nearly its full height.

A represents the body of the cab or carriage, B the wheels, and C the axle.

In order to place the doors under the control of the driver, so that he can readily open or close same, as may be required, we secure to the upper end of each of the doors 1 a small arm U, that carries an oblique rod $u$, connected to an upright rod $v$ by means of a suitable gearing V, which may consist of cog-wheels, as shown, or any other suitable universal joint. The upper end of the upright rods $v$ are fitted with cog-wheels W, that are in gear with quadrants X on the ends of levers $x$ $x$, fulcrumed at $x'$ to the roof of the cab, the inner ends of said levers being pivoted to the end of a tube Y, that passes just under the roof of the cab or carriage and out through an opening in same and is at its outer end fitted with a handle $y$, so that the rod or tube can be pulled back or pushed forward, thus closing or opening the doors 1. The tube Y is slotted on its under side and has mounted therein a carrier Z for operating the window, the outer end of which is by a cord $a$ attached to a wheel $b$, free to be rotated by the driver turning a lever $b'$, attached thereto. To the inner end of the carrier Z is fulcrumed a plate $z^2$, that is secured to the upper portion of the window-frame Z', so that when the carrier Z is drawn back by turning the handle $b'$ the window-frame will be drawn with it.

In order to raise the window-frame, the following mechanism is employed: In each of the side sashes of the window-frame is formed a groove 2, in which is free to slide a block 3, carrying a wheel or roller 4, that is at all times in contact with the inner side of the window-frame Z'. To each of the blocks 3 is attached a cord 5, that passes up and over a pulley 6, mounted a short distance above the top of the frame of the window Z'. This cord 5 then passes down, and its end is secured to the side of the window-frame Z'. Now, supposing the window-frame Z' to be in the lowered position, as shown in Fig. 3, and it is desired to raise same, upon turning the arm $b'$ of the wheel $b$ the cord $a$ will draw back the carrier Z and with it the upper end of the window-sash Z', the same bearing against the rollers 4 until the slack of the cords 5 has been taken up. When the cords 5 are drawn tight, the upper end of the sash being still drawn back, the rollers 4 will be raised, and of course with them the lower edge of the window-sash, as it rests upon same, (see Fig. 4,) until the rollers 4 and the lower end of the window-sash have been brought to the required height. The sash Z' is then supported at its upper end by the carrier Z and at its lower end by the rollers 4, so that by releasing the handle $b'$ the weight of the sash Z' will cause the rollers 4 to fall and with them the lower end of the sash until it is in its proper normal closed position.

It will be seen that when the rod Y is operated to open the doors 1 the carrier Z will be carried for a short distance, thus raising the window a little, so that the doors are free to be operated, and by manipulating the handle $b'$ the window can be raised to its full height.

We form the doors and windows of a bow or circular form, as shown, in order to give a larger space within the cab for the knees of the passengers.

Instead of having the doors operated independently of the windows the tube Y might be closed at its outer end, as shown in Fig. 4, so that when the window has been drawn up to nearly its full height the carrier Z will come into contact with the closed end of the tube and draw it back, thus opening the doors, which can be be closed independently of the window by operating the handle $y$.

What we claim as our invention is—

1. In a hansom-cab, a window-operating device consisting of a carrier, mounted in a slotted tube under the roof of the vehicle and operated by a lever, a plate fulcrumed to the forward end of the carrier and secured to the upper end of the window-sash, a groove in each of the side frames of the window-sash, blocks working in said grooves each carrying a pulley in contact with the inner side of the window-sash, cords attached to said blocks and passing over pulleys above the window-sash the outer end of said cords being secured to the sides of the window-sash so that when the upper end of the window-sash is drawn back a certain distance, the blocks and their pulleys will be raised and carry the lower end of the sash up substantially as set forth.

2. In combination with the doors of a hansom-cab, arms U, secured to said doors, rods $u$, projecting at right angles therefrom, upright rods $v$, gears V, between said rods $u$, $v$, cog-gears W, on the upper end of said rods $v$, toothed quadrants X, on the ends of levers $x$, said levers being fulcrumed at about their center and their inner ends attached to a tube Y, fitted at its outer end with a handle $y$, substantially as and for the purpose set forth.

3. In combination with a hansom-cab a slotted tube Y, extending under the roof, a carrier Z mounted in the same, a cord $a$, attached to said carrier at one end and to a wheel $b$, at the other end, a plate $z^2$, fulcrumed to the front end of the carrier and secured to the upper end of the window-frame, blocks 3 working in grooves formed in the side frames of the window, said blocks 3, carrying rollers 4, in contact with the inner sides of the window-sash, and cords 5, secured to said blocks 3, and passing over sheaves 6, their outer ends being secured to the sides of the sash substantially as and for the purpose set forth.

In testimony whereof we have signed our names to this specification, in the presence of two subscribing witnesses, on this 10th day of January, A. D. 1898.

LUBIN PARADIS.
NARCISSE DESROSIERS.

Witnesses:
CALEB H. SWAN,
EDWIN PLANTA.